US010067725B2

(12) United States Patent
Fujita

(10) Patent No.: US 10,067,725 B2
(45) Date of Patent: Sep. 4, 2018

(54) COMMUNICATION APPARATUS AND CONTROL METHOD OF THE SAME

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 15/072,713

(22) Filed: Mar. 17, 2016

(65) Prior Publication Data
US 2016/0274850 A1    Sep. 22, 2016

(30) Foreign Application Priority Data

Mar. 19, 2015  (JP) ................. 2015-056861

(51) Int. Cl.
G06F 3/12 (2006.01)
H04W 52/02 (2009.01)
H04N 1/00 (2006.01)

(52) U.S. Cl.
CPC .......... *G06F 3/1292* (2013.01); *G06F 3/1204* (2013.01); *G06F 3/1221* (2013.01); *G06F 3/1226* (2013.01); *G06F 3/1236* (2013.01); *H04N 1/00127* (2013.01); *H04W 52/0216* (2013.01); *H04W 52/0229* (2013.01); *Y02D 10/1592* (2018.01); *Y02D 70/00* (2018.01); *Y02D 70/142* (2018.01); *Y02D 70/144* (2018.01); *Y02D 70/162* (2018.01)

(58) Field of Classification Search
CPC .... G06F 3/1292; G06F 3/1204; G06F 3/1226; G04F 3/1221
See application file for complete search history.

(56) References Cited

U.S. PATENT DOCUMENTS

| 2007/0141986 A1* | 6/2007 | Kuehnel ............... H04W 48/16 455/41.2 |
| 2010/0083020 A1* | 4/2010 | Suzuki ................. G06F 1/3209 713/322 |
| 2012/0235922 A1* | 9/2012 | Locker .................. G06F 3/1462 345/173 |

FOREIGN PATENT DOCUMENTS

| JP | 2009-521190 A | 5/2009 |
| WO | 2007/075961 A2 | 7/2007 |

* cited by examiner

Primary Examiner — Siming Liu
(74) Attorney, Agent, or Firm — Cowan, Liebowitz & Latman, P.C.

(57) ABSTRACT

A communication apparatus which has first and second power consumption states, comprises a detection unit which, by receiving predetermined information from an external apparatus in the second state before connecting to a network, detects an external apparatus in which a predetermined function is available, a connection unit which, in a case where an external apparatus in which the predetermined function is available is detected, causes the communication apparatus to connect to a common network with the external apparatus in which the predetermined function is available; a processing unit which, after connecting to the common network, communicates with the external apparatus in which the predetermined function is available, and performs processing based on the predetermined function, and a transition unit which causes the communication apparatus to transition from the second state to the first state.

15 Claims, 7 Drawing Sheets

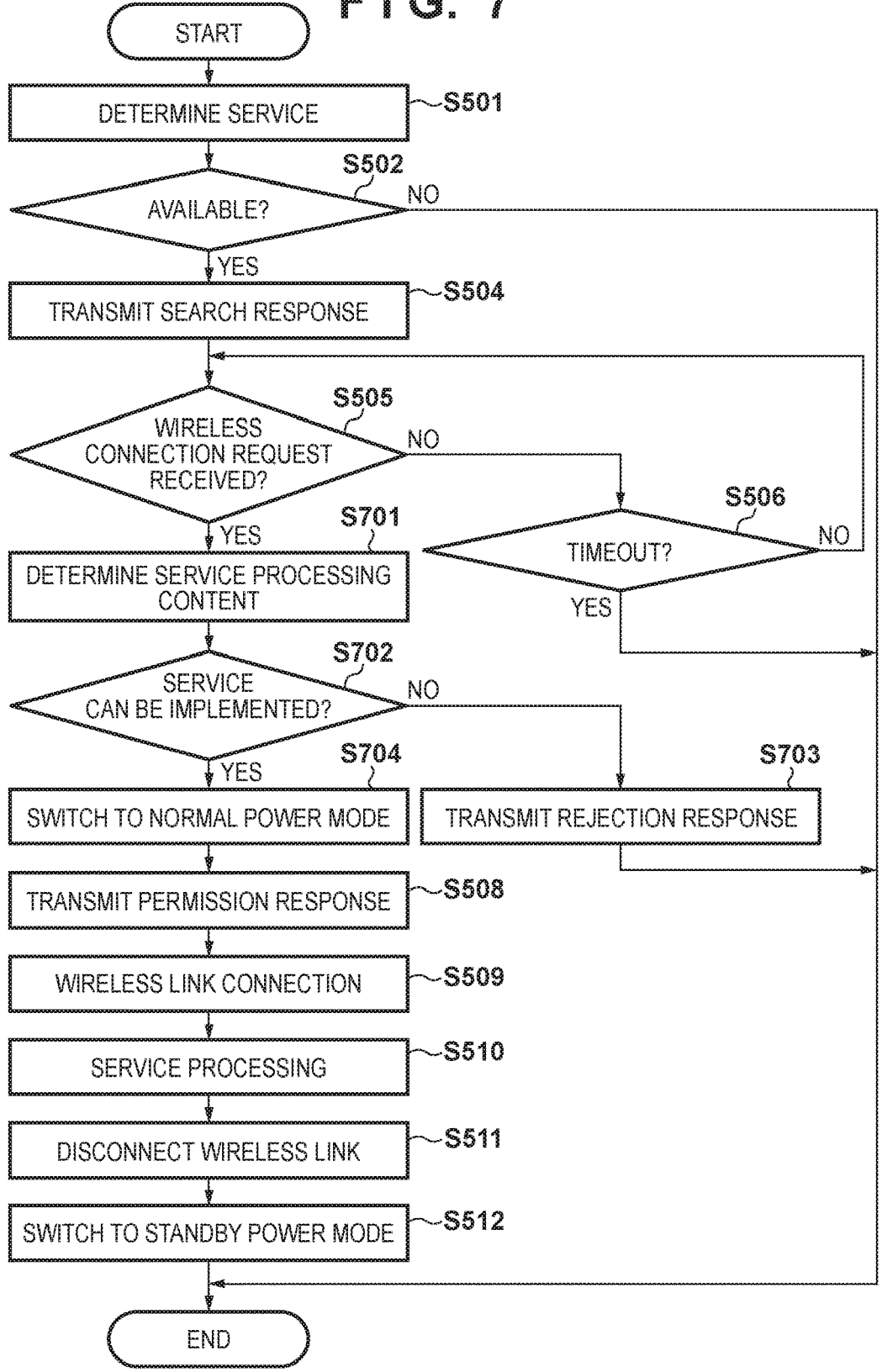

COMMUNICATION APPARATUS AND CONTROL METHOD OF THE SAME

BACKGROUND OF THE INVENTION

Field of the Invention

The present invention relates to a communication apparatus and a control method of the same.

Description of the Related Art

In recent years, a service discovery technique for searching for an available service before connecting to a wireless network has been proposed. With this technique, a wireless network that provides a desired service can be detected before the connection, and thus it is possible to seamlessly perform process from wireless network connection to various service processes. Japanese Patent Laid-Open No. 2009-521190 proposes a technique with which service information is exchanged before establishment of a connection between apparatuses, and connection is established after it is determined that a desired service is being provided.

In the case where the above-described service discovery technique is applied to a mobile-type electronic device, it is desirable that a response function for service search requests from an external apparatus is always enabled in the waiting state. However, with a mobile electronic device that is driven by a battery, such as a mobile phone or a digital camera, a reduction in power consumption in the waiting state in which the electronic device can receive a service search request from the external apparatus is an important problem.

SUMMARY OF THE INVENTION

The present invention has been made in consideration of the aforementioned problems, and realizes a reduction in power consumption in a waiting state in which a service search request can be received from an external apparatus.

In order to solve the aforementioned problems, the present invention provides a communication apparatus which has at least a first state and a second state in which power consumption is less than in the first state, comprising: a detection unit configured to, by receiving predetermined information from an external apparatus in the second state before connecting to a network, detect an external apparatus in which a predetermined function is available; a connection unit configured to, in a case where an external apparatus in which the predetermined function is available is detected by the detection unit, cause the communication apparatus to connect to a common network with the external apparatus in which the predetermined function is available; a processing unit configured to, after connecting to the common network by the connection unit, communicate with the external apparatus in which the predetermined function is available using the predetermined information, and perform processing based on the predetermined function; and a transition unit configured to cause the communication apparatus to transition from the second state to the first state before the processing based on the predetermined, function is performed by the processing unit.

In order to solve the aforementioned problems, the present invention provides a control method of a communication apparatus which has at least a first state and a second state in which power consumption is less than in the first state, the method comprising: detecting, by receiving predetermined information from an external apparatus in the second state before connecting to a network, an external apparatus in which a predetermined function is available; causing the communication apparatus to connect to, in a case where an external apparatus in which the predetermined function is available is detected, a common network with the external apparatus in which the predetermined function is available; after connecting to the common network, communicating with the external apparatus in which the predetermined function is available using the predetermined information, and performing processing based on the predetermined function; and causing the communication apparatus to transition from the second state to the first state before the processing based on the predetermined function is performed.

In order to solve the aforementioned problems, the present invention provides a non-transitory computer-readable storage medium storing a program for causing a computer to execute a control method of a communication apparatus which has at least a first state and a second state in which power consumption is less than in the first state, the method comprising: detecting, by receiving predetermined information from an external apparatus in the second state before connecting to a network, an external apparatus in which a predetermined function is available; causing the communication apparatus to connect to, in a case where an external apparatus in which the predetermined function is available is detected, a common network with the external apparatus in which the predetermined function is available; after connecting to the common network, communicating with the external apparatus in which the predetermined function is available using the predetermined information, and performing processing based on the predetermined function; and causing the communication apparatus to transition from the second state to the first state before the processing based on the predetermined function is performed.

According to the present invention, it is possible to realize a reduction in power consumption in a waiting state in which a service search request can be received from an external apparatus.

Further features of the present invention will become apparent from the following description of exemplary embodiments with reference to the attached drawings.

BRIEF DESCRIPTION OF THE DRAWINGS

FIG. 7 is a flowchart showing a process until service processing is performed in response to a service search request of the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, an embodiment that is applied to a digital camera having a wireless LAN communication function as a communication apparatus of the present invention will be described. Note that the present invention is not limited to this, and is broadly applicable to electronic devices that can communicate with external apparatus using a wireless communication function.

Also, although an example of a wireless communication system in which a wireless LAN conforming to IEEE 802.11 is used will be described hereinafter, the communication mode is not necessarily limited to a wireless LAN conforming to IEEE 802.11.

Hardware Configuration or Communication Apparatus

First, a hardware configuration of a communication apparatus of the present embodiment will be described with reference to FIG. 1.

Figure 1:
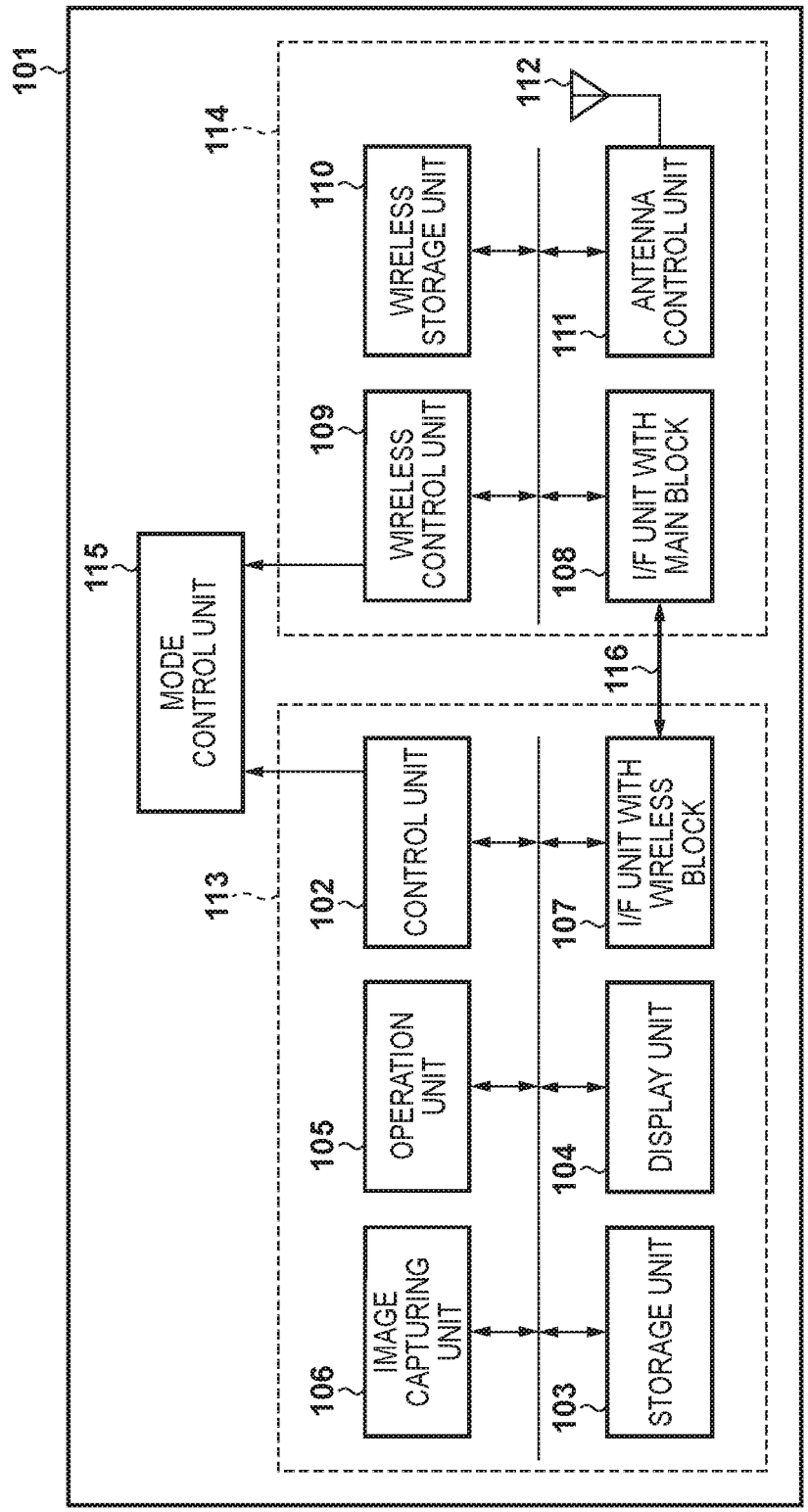
FIG. 1 is a hardware configuration diagram of a communication apparatus of an embodiment according to the present invention.

FIG. 1 is a block diagram showing an example of a hardware configuration of a communication apparatus 101 of the present embodiment.

As shown with dotted lines in FIG. 1, the communication apparatus 101 includes a main block 113 and a wireless block 114 whose power supply is independently controlled. The main block 113 includes a control unit 102, a storage unit 103, a display unit 104, an operation unit 105, an image capturing unit 106, and an interface (I/F) unit 107 with the wireless block. The wireless block 114 includes an interface (I/F) unit 108 with the main block, a wireless control unit 109, a wireless storage unit 110, an antenna control unit 111, and an antenna 112.

The main block 113 and the wireless block 114 are connected with an interblock digital interface 116, and various types of data that are transmitted and received by wireless communication are sent via the interface 116. For example, a SDIO interface, a USB interface, a PCI Express interface, and the like are used as the interblock digital interface 116.

The control unit 102 controls the entire communication apparatus by performing a control program stored in the storage unit 103. The control unit 102 includes one or more processors such as a CPU or MPU.

The storage unit 103 stores the control program performed by the control unit 102 and various types of information such as communication parameters. Also, the storage unit 103 may store image data, other files, and the like that have been generated by the image capturing unit 106 or have been received from an external apparatus. Various types of memories such as a ROM, a RAM, a HDD, and a flash memory are used as the storage unit 103.

The display unit 104 has a LCD or a LED that carries out various types of displays, and has a function of outputting visually recognizable information. Also, the display unit 104 may have a function with which audio can be output, such as a speaker.

The operation unit 105 is an input unit configured to accept various types of operation inputs by a user, and includes various buttons, a touch panel and the like for operating the communication apparatus 101.

The image capturing unit 106 includes an optical lens, a CMOS image sensor, a digital image processing unit, and the like, and converts an analog signal input via the optical lens into digital data to generate image data. The image data generated by the image capturing unit 106 is stored in the storage unit 103.

The interface unit 107 has an interface function with the wireless block 114.

The interface unit 108 has an interface function with the main block 113.

The wireless control unit 109 performs various functions of a wireless layer by performing a control program stored in the wireless storage unit 110. The wireless control unit 109 includes one or more processors such as a CPU or MPU.

The wireless storage unit 110 stores the control program performed by the wireless control unit 109 and various types of information. Various types of memories such as a ROM and a RAM are used as the wireless storage unit 110.

The antenna control unit 111 controls the antenna 112 to transmit and receive a control signal and a data signal through wireless communication.

The communication apparatus 101 includes two types of power modes, namely, a normal power mode and a standby power mode, as modes for controlling power supply during operation. The normal power mode is a mode in which both the main block 113 and the wireless block 114 are active, and the standby power mode is a power saving mode in which only the wireless block 114 is active. Switching these power modes is carried out by a mode control unit 115. The mode control unit 115 carries out control based on an instruction from a mechanical switch (not shown) that does not belong to any of the control unit 102, the wireless control unit 109, the main block 113, or the wireless block 114. Switching from the normal power mode to the standby power mode is performed upon receiving an instruction from the control unit 102, triggered mainly by a user operation or timer control. On the other hand, switching from the standby power mode to the normal power mode is performed, based on an instruction from the above-described mechanical switch or wireless control unit 109, triggered by release by a user operation or reception of a wireless LAN packet including service information that will be described later.

Software Configuration of Communication Apparatus

Next, a software configuration of the communication apparatus 101 of the present embodiment will be described with reference to FIG. 2.

Figure 2:
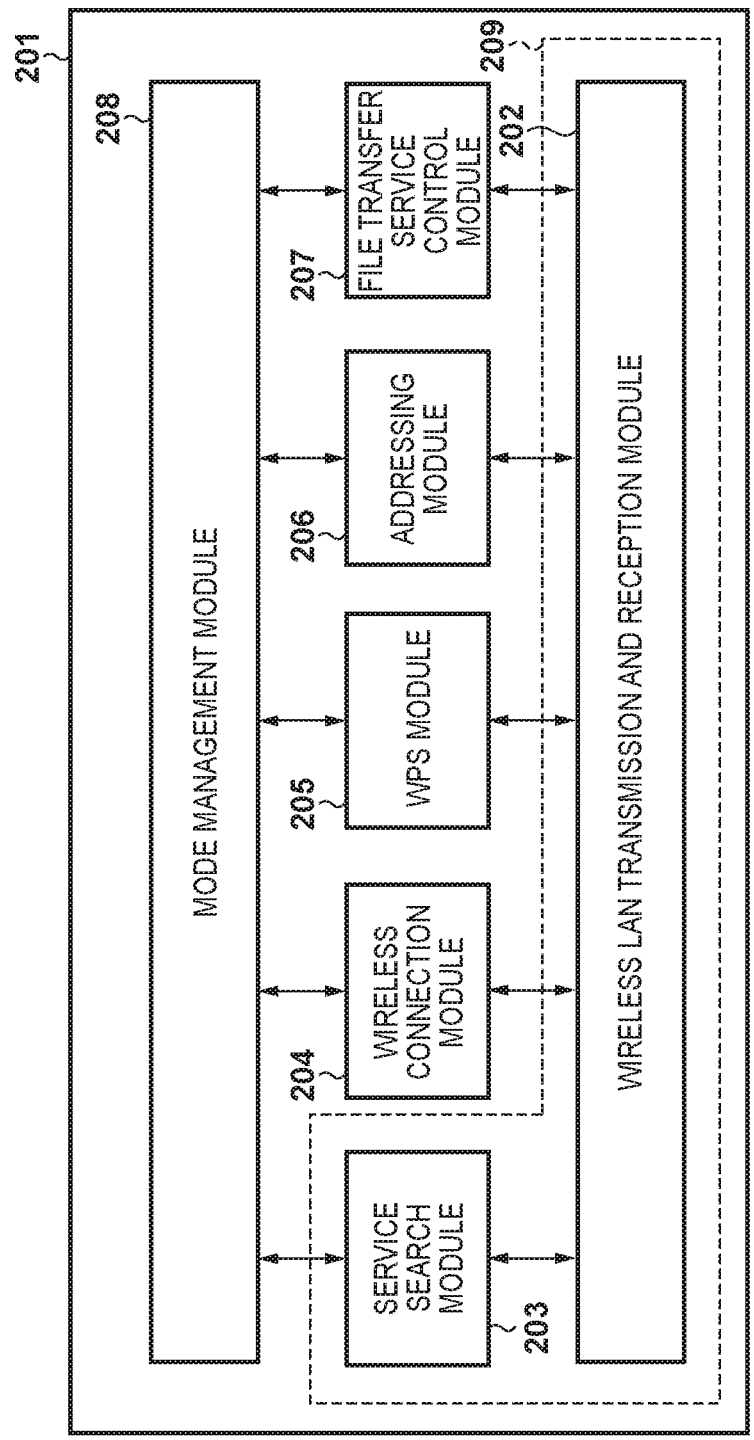
FIG. 2 is a software configuration diagram of a communication apparatus of the embodiment.

FIG. 2 is a diagram showing an example of a configuration of a software module 201 for performing a communication control function that is provided in the communication apparatus 101 of the present embodiment.

The software module 201 includes function modules 202 to 208 shown in FIG. 2.

A wireless LAN transmission and reception module 202 administers transmission and reception of all packets including a communication protocol of an upper layer.

A service search module 203 controls a service search function specific to Wi-Fi Direct. The service search module 203 acquires information indicating processing content of a service provided by an external apparatus, which is a communication partner, and provides information indicating processing content of a service provided by its own apparatus to the external apparatus by transmitting and receiving an action frame (service request) defined by IEEE 802.11u.

The wireless connection module 204 has a wireless LAN station function, a wireless LAN access point function, and a Wi-Fi Direct protocol function. Here, the Wi-Fi Direct protocol is a function of performing process for determining roles in the wireless layer, namely, which communication apparatus serves as the wireless LAN access point and which communication apparatus serves as the wireless LAN station.

The WPS module 205 has a function of operating as a WPS enrollee or a WPS registrar. In the case where the communication apparatus 101 is the wireless LAN client, the communication apparatus 101 operates as the WPS enrollee and receives a communication parameter required for wireless LAN communication from another WPS registrar device. In the case where the communication apparatus 101 is the wireless LAN access point, the communication apparatus 101 operates as the WPS registrar and provides communication parameters required for the wireless LAN communication to another WPS enrollee device. Note that an SSID serving as network identification information, a cryptographic key, a cryptographic method, an authentication key, an authentication method, and the like are used as the communication parameters.

An addressing module 206 has a function of operating as a DHCP client or a DHCP server. In the case where the communication apparatus 101 is the wireless LAN client, the communication apparatus 101 operates as the DHCP client and acquires an IP address from an external DHCP server. In the case where the communication apparatus 101 is the wireless LAN access point, the communication apparatus 101 operates as the DHC server and allocates an IP address to an external DHCP client.

A file transfer service control module 207 has a function of implementing file transfer processing with an external apparatus, which serves as a communication partner. The file transfer service control module 207 has both a function of transmitting data to the external apparatus and a function of receiving data from the external apparatus, and these functions can be independently controlled.

A mode management module 208 has a function of managing the overall control of the function modules 203 to 207.

A frame 209 indicated by dotted lines in FIG. 2 indicate a module performed by the wireless control unit 109 of the wireless block 114 in FIG. 1. As shown in FIG. 2, the wireless LAN transmission and reception module 202 and the service search module 203 are performed by the wireless control unit 109, and thus the wireless LAN transmission and reception module 202 and the service search module 203 can also be performed in a standby power mode.

Note that the function modules shown in FIG. 2 are merely examples, and a configuration is possible in which one module is constituted by a plurality of modules, or in which any of the modules is further divided into modules that carry out a plurality of functions.

Network Configuration

Figure 3:
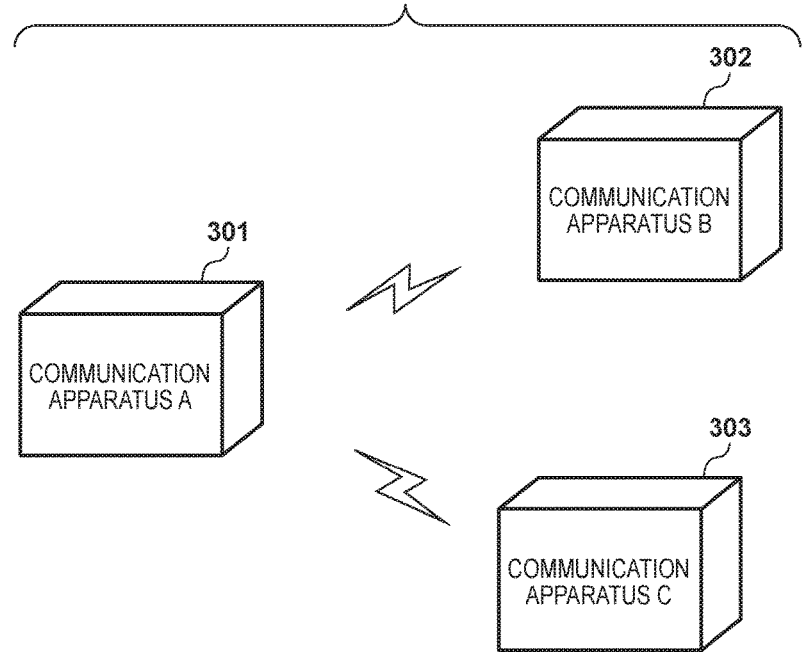
FIG. 3 is a configuration diagram of a network system of the embodiment.

Next, a network configuration of the present embodiment will be described with reference to FIG. 3.

It is assumed that a communication apparatus A (301), a communication apparatus B (302), and a communication apparatus C (303) all have the hardware configuration shown in FIG. 1 and the software configuration shown in FIG. 2. It is assumed that the communication apparatus A and the communication apparatus B are in a state in which a function of transmitting a file transfer service (hereinafter, file transmission service) is enabled, and the communication apparatus C is in a state in which a function of receiving a file transfer service (hereinafter, file reception service) is enabled.

Hereinafter, the communication apparatus A will be described as an exemplary communication apparatus according to the present invention.

Processing Sequence

Figure 4:
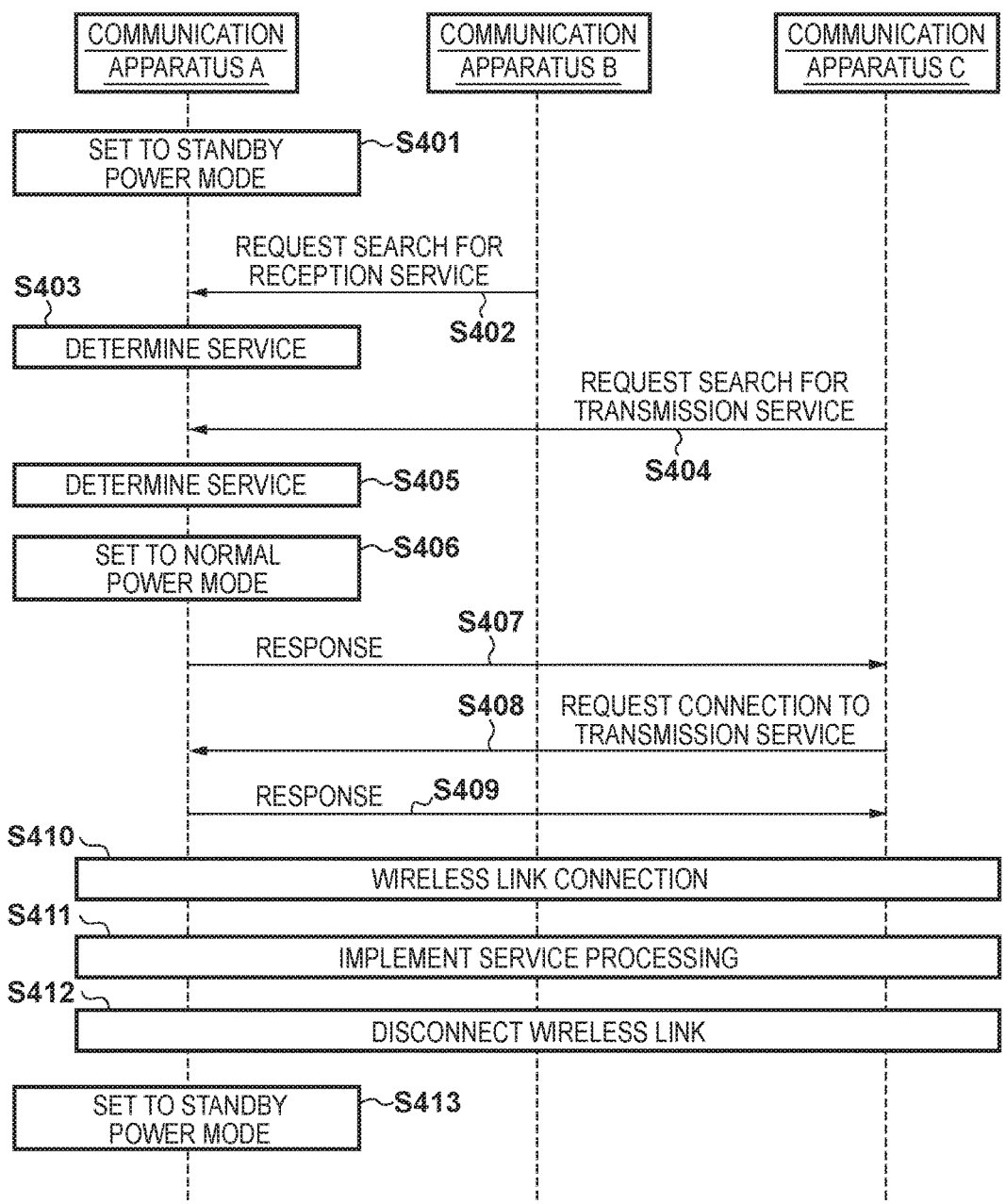
FIG. 4 is a diagram of a processing sequence until service processing is performed in response to a service search request of a first embodiment.

Processing sequence will be described with reference to FIG. 4 in which the communication apparatus B and the communication apparatus C perform processes for searching for a file transfer service in a state in which a wireless link connection is not established among communication apparatuses A to C in the network configuration in FIG. 3, and the communication apparatus A responds to these processes.

The communication apparatus B, which is in a state in which the file transmission service is enabled, searches for a file reception service, and the communication apparatus C, which is in a state in which the file reception service is enabled, searches for a file transmission service.

As an initial state, the communication apparatus A is in the standby power mode due to a user operation or the like (step S401).

Upon receiving a service search request from the communication apparatus B (step S402), the communication apparatus A determines the service targeted by the search (step S403). The communication apparatus A does not transmit a response to the service search request because the file receiving service targeted by the search is not available in the communication apparatus A.

Next, upon receiving a service search request from the communication apparatus C (step S404), the communication apparatus A determines the service targeted by the search (step S405). Because the service targeted by the search is an available file transmission service in the communication apparatus A, the communication apparatus A switches the power mode from the standby power mode to the normal power mode (step S406), and transmits a response to the service search request to the communication apparatus C (step S407).

Thereafter, upon receiving a connection request for the file transmission service from the communication apparatus C (step S408), the communication apparatus A transmits a success response (step S409), and establishes a wireless link connection based on the Wi-Fi Direct protocol (step S410).

Subsequently, the communication apparatus A performs process (service processing) for transmitting a file to the communication apparatus C based on the transmission service (step S411).

When all of the processes of the file transmission service end, the communication apparatus A disconnects the wireless link connection (step S412) and returns the power mode to the standby power mode (step S413).

Service Search Request Response Processing

Next, a service search request response processing that is carried out by the communication apparatus A of the present embodiment will be described with reference to FIG. 5.

Figure 5:
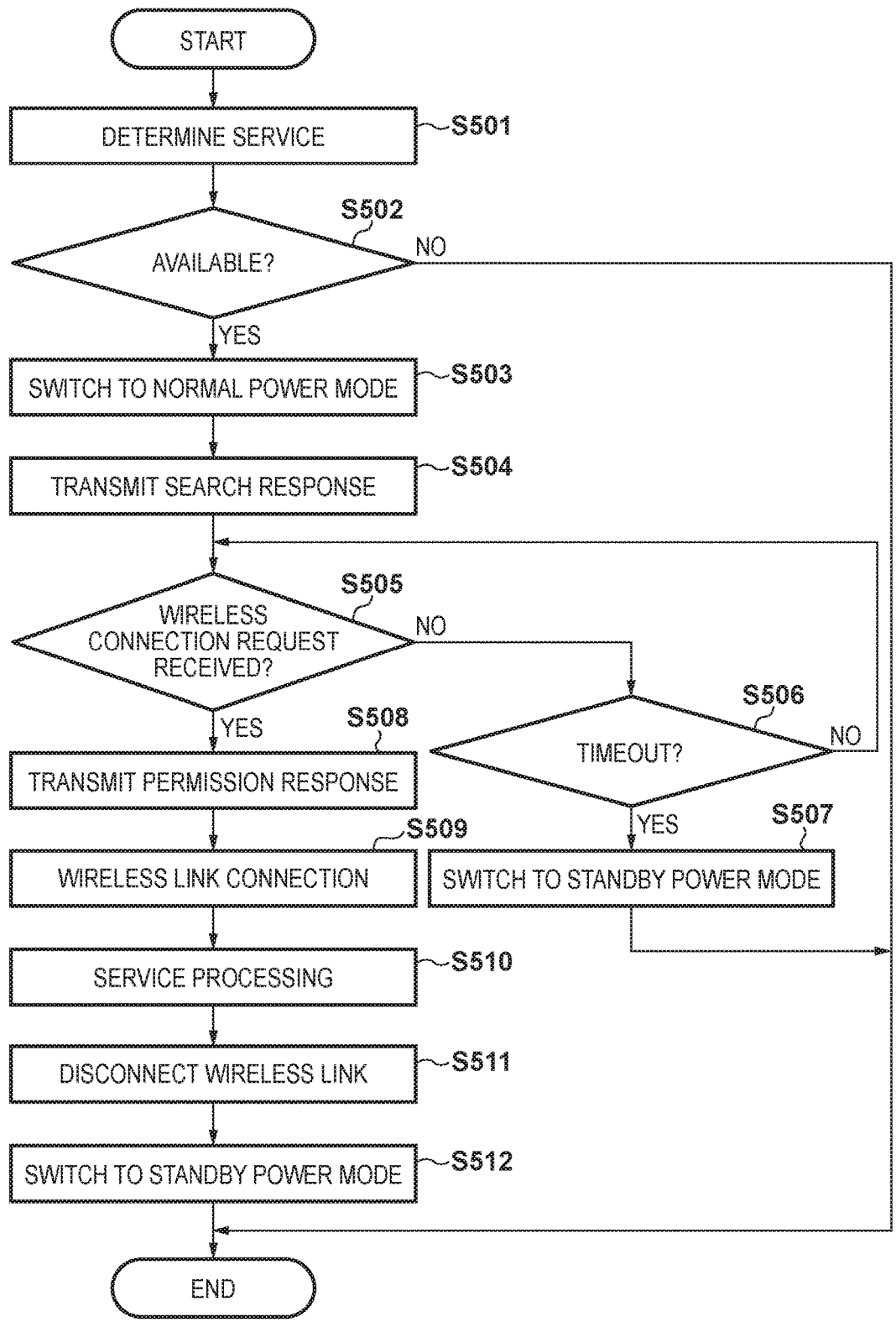
FIG. 5 is a flowchart showing a process until service processing is performed in response to a service search request of the first embodiment.

Note that the process from step S501 to step S504 in FIG. 5 corresponds to the function of the service search module 203 of FIG. 2, and is realized by the wireless control unit 109 of the wireless block 114 performing the control program stored in the wireless storage unit 110. Also, the process from step S505 onward is realized by the control unit 102 of the main block 113 performing the control program stored in the storage unit 103.

This flowchart is started upon a service search request being received from an external apparatus (communication apparatus B or C) in the state in which the communication apparatus A is in the state of operating in the standby power mode, and is cooperatively performed by the control unit 102 of the main block 113 and the wireless control unit 109 of the wireless block 114.

The wireless control unit 109 in step S501 determines the search target service included in the service search request that has been received from the external apparatus.

In step S502, as a result of the determination, if the search target service is an available service in its own apparatus, the process advances to step S503, whereas if the search target service is an unavailable service, the wireless control unit 109 ends the processing.

In step S503, the wireless control unit 109 controls the mode control unit 115 to switch the power mode to the normal power mode. Accordingly, the blocks of the main block 113 enter the active state.

In step S504, the wireless control unit 109 transmits the service search response to the external apparatus.

In steps S505 and S506, the control unit 102 determines whether or not a wireless connection request has been received from an external apparatus in a predetermined period of time. Note that the wireless connection request may include information relating to the service processing that the external apparatus wants to implement. As a result of the determination, if a wireless connection request has been received, the process advances to step S508, whereas if a wireless connection request has not been received, the process advances to step S507. The predetermined period of time is set to three seconds, for example.

In step S507, the control unit 102 controls the mode control unit 115 to switch the power mode to the standby power mode, and ends the processing.

In step S508, the control unit 102 transmits a response indicating that the wireless connection request is permitted to the external apparatus.

In step S509, the control unit 102 establishes a wireless link connection with the external apparatus based on the Wi-Fi Direct protocol.

In step S510, the control unit 102 implements the file transmission processing (service processing) that is implemented by the file transmission service.

In step S511, the control unit 102 disconnects the wireless link connection to the external apparatus.

In step S512, the control unit 102 controls the mode control unit 115 to switch the power mode to the standby power mode, and ends the processing.

As described above, according to the present embodiment, the power mode is switched to the normal power mode in accordance with the service targeted by the search, and in the case where the search target service is not available in its own apparatus, control is carried out such that the power mode is not switched to the normal power mode. Accordingly, it is possible to suppress unnecessary power consumption in the state of waiting for a response to the service search request.

Note that although control of whether or not the power mode is switched to the normal power mode is performed by determining the search target service in the above steps S501 and S502 in the present embodiment, the search target service can be applied to an embodiment such as described below. For example, a configuration is possible in which the service search request can designate not only desirable service information but also a MAC address as identification information for specifying an external apparatus that wants to establish a wireless connection and implement the service processing. A configuration is also possible in which in the case where a service search request that designate a MAC address has been received, if the service search request does not match the MAC address of its own apparatus, processing ends without switching the power mode to the normal power mode, regardless of the service content of the search target. Accordingly, it is possible to avoid unnecessary switching to the normal power mode.

Also, although the file transfer service for transmitting image data of the communication apparatus to the external apparatus has been described as an example in the present embodiment, the present invention is not limited thereto. For example, the present invention is applicable to an image reproduction service for causing an external apparatus to reproduce image data of the communication apparatus, a printing service for printing image data of the communication apparatus with an external apparatus, and the like.

Furthermore, although the only service available in the communication apparatus A is the file transfer service in the present embodiment, a configuration is possible in which the above-described image reproduction service and the printing service are available at the same time. In this case, if it is determined in the determination processing in step S502 that the search target service corresponds to any one of the available services, the process transitions to step S503.

Second Embodiment

Next, a second embodiment will be described.

The first embodiment is configured such that after transmitting the success response to the service search request (step S409), the power mode is switched to the normal power mode. In a second embodiment, a case where the power mode is switched to the normal power mode after transmission of a response indicating that the wireless connection request is permitted will be described.

Note that the present embodiment will be described, focusing on differences from the first embodiment. Also, the configuration of the communication apparatuses and the network configuration are similar to the first embodiment, and therefore description thereof is omitted.

Figure 6:
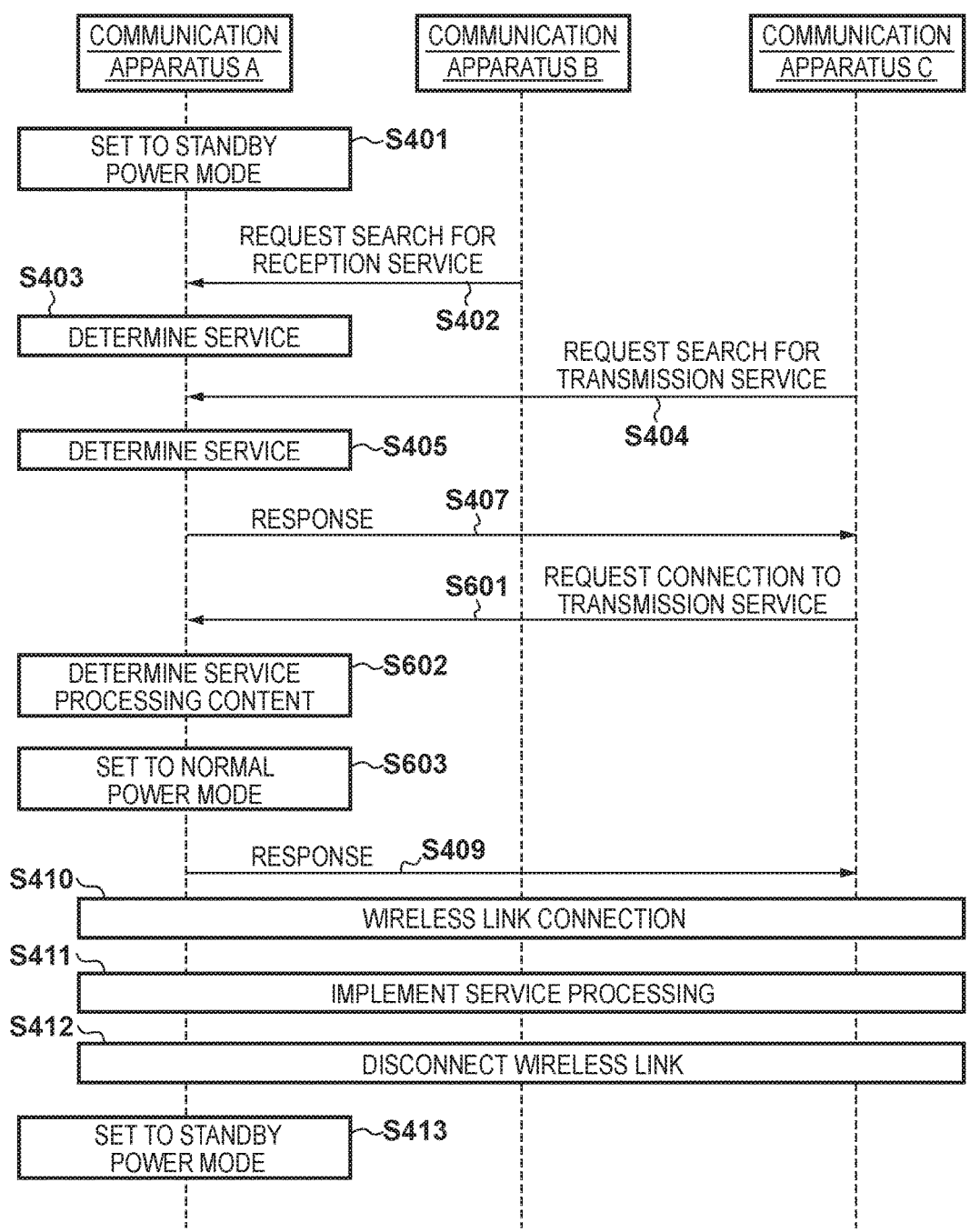
FIG. 6 is a diagram of a processing sequence until service processing is performed in response to a service search request of a second embodiment.

FIG. 6 shows a processing sequence in which a communication apparatus B and a communication apparatus C perform a search for a file transfer service and a communication apparatus A responds to the search. Note that processing steps having the same content as that of FIG. 4 are given the same reference numerals and redundant description is omitted, and only processing steps having different content will be described.

Upon receiving a service search request from the communication apparatus C in step S404, the communication apparatus A determines the service targeted by the search (step S405). The communication apparatus A determines that the service targeted by the search is an available file transmission service in the communication apparatus A, and transmits a service search response to the communication apparatus C (step S407).

Thereafter, upon receiving the wireless connection request for the file transmission service from the communication apparatus C (step S601), the communication apparatus A determines the service information included in the wireless connection request (step S602). The service information is information indicating processing content of the file transfer service that the communication apparatus C has requested from the communication apparatus A. For example, information relating to the transfer target file (name, number, size, type, and format form), information relating to free space in memory on the file reception side, and the like are included.

If it is determined in step S602 that the processing content of the service can be implemented, the communication apparatus A switches the power mode from the standby power mode to the normal power mode (step S603), transmits a success response for the wireless connection request (step S409), and establishes a wireless link connection based on the Wi-Fi Direct protocol (step S410).

FIG. 7 shows service search request response processing by the communication apparatus A of the present embodiment. Hereinafter, the same process as that of FIG. 5 is given the same reference numerals and description thereof is omitted, and only process having different content will be described.

Note that in FIG. 7, processes from steps S501, S502, and steps S504 to S506, S508, and steps S701 to S704 corresponds to functions of the service search module 203 of FIG. 2, and is realized by the wireless control unit 109 of the wireless block 114 performing the control program stored in the wireless storage unit 110. Also, the processes from step S509 onward is realized by the control unit 102 of the main block 113 performing the control program stored in the storage unit 103.

In step S502, as a result of the determination, if the search target service is an available service in its own apparatus, the process advances to step S504, whereas if the search target service is an unavailable service, the wireless control unit 109 ends the processing.

As a result of the determination in steps S505 and S506, if it is determined that a wireless connection request has been received, the process advances to step S701, whereas if the wireless connection request has not received in a predetermined period of time, the processing ends.

In step S701, the control unit 102 determines processing content of the service from the service information included in the wireless connection request that has been received from the external apparatus.

In step S702, if the processing content of the service can be implemented in its own apparatus, the control unit 102 advances to step S704, whereas if the processing content cannot be implemented, the process advances to step S703.

In step S703, the control unit 102 transmits a rejection response to the wireless connection request, and ends the processing.

In step S704, the control unit 102 controls the mode control unit 115 to switch the power mode to the normal power mode. Accordingly, the blocks of the main block 113 enter the active state.

As described above, according to the present embodiment, the power mode is switched to the normal power mode in accordance with the processing content of the service included in the wireless connection request. Accordingly, even if the search target service is an available service in its own apparatus, in the case where processing content that cannot be implemented is requested, the power mode is not switched to the normal power mode, and therefore it is possible to suppress unnecessary power consumption more than with the configuration of the first embodiment.

Note that the present embodiment is applicable to not only a file transfer service but also an image reproduction service, a printing service, and the like. For example, in the case where the present embodiment is applied to an image reproduction service, information on the format or the size of a file to be reproduced can be applied as service information, and it is sufficient to determine in steps S701 and S702 whether or not the image reproduction processing can be implemented under these conditions. Also, in the case where the present embodiment is applied to a printing service, information relating to the size of sheets to be printed and the ink can be applied as the service information, and it is sufficient to determine in steps S701 and S702 whether or not the print processing can be implemented under these conditions.

Other Embodiments

The above-described first and second embodiments can be used in combination as appropriate, and a configuration is possible in which a user can arbitrary select whether the communication apparatus operates in accordance with the first or second embodiment, for example.

Also, an example of a wireless LAN conforming to IEEE 802.11 as the wireless communication function has been described in the present embodiment. However, the present invention may be implemented using other wireless communication such as a wireless USB, MBOA (Multi Band OFDM Alliance), Bluetooth (registered trademark), UWB, or ZigBee (registered trademark). Also, the present invention may be implemented in a wired communication medium such as a wired LAN. Note that the UWB includes a wireless USB, a wireless 1394, WINET, and the like.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-056861, filed Mar. 19, 2015 which is hereby incorporated by reference herein in its entirety.

What is claimed is:

1. A communication apparatus which has at least a first state and a second state in which power consumption is less than in the first state, comprising:
a processor; and a memory coupled to the processor storing instructions that, when executed by the processor, cause the processor to function as:
a detection unit configured to, by receiving predetermined information from an external apparatus in the second state before connecting to a network, detect an external apparatus in which a predetermined function is available;
a connection unit configured to, in a case where an external apparatus in which the predetermined function is available is detected by the detection unit, cause the communication apparatus to connect to a common network with the external apparatus in which the predetermined function is available;
a processing unit configured to, after connecting to the common network by the connection unit, communicate with the external apparatus in which the predetermined function is available using the predetermined information, and perform processing based on the predetermined function; and
a transition unit configured to cause the communication apparatus to transition from the second state to the first state before the processing based on the predetermined function is performed by the processing unit,
wherein the transition unit causes the communication apparatus to transition from the second state to the first state, before the communication apparatus is connected to the network by the connection unit after an external apparatus in which the predetermined function is available is detected by the detection unit.

2. The apparatus according to claim 1,
wherein the predetermined information is a request for utilizing the predetermined function.

3. The apparatus according to claim 1,
wherein the predetermined function is a service to be provided by the communication apparatus.

4. The apparatus according to claim 1,
wherein the transition unit causes the communication apparatus to transition from the first state to the second state, in a case where the communication apparatus has not connected to the network before a predetermined period of time elapses after causing the communication apparatus to transition from the second state to the first state.

5. The apparatus according to claim 1, further comprising a transmission unit configured to, after an external apparatus in which the predetermined function is available is detected by the detection unit, transmit a response to the external apparatus.

6. The apparatus according to claim 5,
wherein the transmission unit does not transmit the response to an external apparatus in which the predetermined function is not available.

7. The apparatus according to claim 1,
wherein even if an external apparatus in which the predetermined function is not available is detected by the detection unit, the transition unit does not cause the communication apparatus to transition from the second state to the first state.

8. The apparatus according to claim 1,
wherein the connection unit connects to a common network with the external apparatus based on a Wi-Fi Direct protocol.

9. The apparatus according to claim 1,
wherein the connection unit causes the communication apparatus to connect to a common network with the external apparatus based on a Bluetooth protocol.

10. The apparatus according to claim 1,
wherein the predetermined function includes a function for transmitting or receiving a file.

11. The apparatus according to claim 1,
wherein the predetermined function includes a function for reproducing image data with the external apparatus.

12. The apparatus according to claim 1,
wherein the predetermined function includes a function for printing image data with the external apparatus.

13. The apparatus according to claim 1,
wherein the communication apparatus acquires information for implementing the predetermined function from the external apparatus and determines based on the acquired information whether or not the communication apparatus is capable of implementing the predetermined function, and
the transition unit performs the transition of the state of the communication apparatus after it is determined that the communication apparatus is capable of implementing the predetermined function.

14. A control method of a communication apparatus which has at least a first state and a second state in which power consumption is less than in the first state, the method comprising:
detecting, by receiving predetermined information from an external apparatus in the second state before connecting to a network, an external apparatus in which a predetermined function is available;
causing the communication apparatus to connect to, in a case where an external apparatus in which the predetermined function is available is detected, a common network with the external apparatus in which the predetermined function is available;
after connecting to the common network, communicating with the external apparatus in which the predetermined function is available using the predetermined information, and performing processing based on the predetermined function; and
causing the communication apparatus to transition from the second state to the first state before the processing based on the predetermined function is performed,
wherein the transition from the second state to the first state takes place before the connection of the communication apparatus to the network, after the detection of an external apparatus in which the predetermined function is available.

15. A non-transitory computer-readable storage medium storing a program for causing a computer to execute a control method of a communication apparatus which has at least a first state and a second state in which power consumption is less than in the first state, the method comprising:
detecting, by receiving predetermined information from an external apparatus in the second state before connecting to a network, an external apparatus in which a predetermined function is available;
causing the communication apparatus to connect to, in a case where an external apparatus in which the predetermined function is available is detected, a common network with the external apparatus in which the predetermined function is available;
after connecting to the common network, communicating with the external apparatus in which the predetermined function is available using the predetermined information, and performing processing based on the predetermined function; and causing the communication apparatus to transition from the second state to the first state before the processing based on the predetermined function is performed, wherein the transition from the second state to the first state takes place before the connection of the communication apparatus to the network, after the detection of an external apparatus in which the predetermined function is available.

* * * * *